United States Patent [19]
Ohmi et al.

[11] Patent Number: 5,720,505
[45] Date of Patent: Feb. 24, 1998

[54] PIPE JOINT

[75] Inventors: Tadahiro Ohmi, Sendai; Michio Yamaji, Osaka; Nobukazu Ikeda, Osaka; Tsutomu Shinohara, Osaka; Kazuhiro Yoshikawa, Osaka; Tetsuya Kojima, Osaka, all of Japan

[73] Assignee: Fujikin Incorporated, Osaka, Japan

[21] Appl. No.: 648,501

[22] Filed: May 15, 1996

[30] Foreign Application Priority Data

Aug. 9, 1995 [JP] Japan .................. 7-203214

[51] Int. Cl.⁶ ............................................. F16L 25/00
[52] U.S. Cl. ................. 285/328; 285/906; 285/917
[58] Field of Search .................... 285/328, 917, 285/906

[56] References Cited

U.S. PATENT DOCUMENTS

| | | | |
|---|---|---|---|
| 1,834,581 | 12/1931 | Ferrell et al. | 285/328 |
| 5,251,941 | 10/1993 | McGarvey | 285/328 |
| 5,340,170 | 8/1994 | Shinohara et al. | 285/328 X |
| 5,366,261 | 11/1994 | Ohmi et al. | 285/328 |
| 5,482,332 | 1/1996 | Ohmi et al. | 285/328 |

FOREIGN PATENT DOCUMENTS 378493  7/1990  European Pat. Off. ........ 285/328

*Primary Examiner*—Dave W. Arola
*Attorney, Agent, or Firm*—Armstrong, Westerman, Hattori, McLeland & Naughton

[57] ABSTRACT

A pipe joint comprises a pair of tubular joint members, an annular gasket interposed between abutting end faces of the joint members, and a nut for joining the joint members. A seal projection is formed on the abutting end face of each joint member at a position radially outward of an inner periphery of the end face. When an end of the seal projection is brought into contact with an end face of the gasket by tightening the nut, a clearance is formed between an outer flat portion of the abutting end face of each joint member and the gasket end face opposed thereto. The clearance is greater than a clearance between an inner flat portion of the abutting end face of each joint member and the gasket end face opposed thereto, and is eliminated when the nut is completely tightened up.

6 Claims, 14 Drawing Sheets

PIPE JOINT

BACKGROUND OF THE INVENTION

The present invention relates to pipe joints.

U.S. Pat. No. 4,650,227 of Babuder et al. and EP 0,378,493 disclose pipe joints which comprise a pair of tubular joint members each having an abutting end face and an annular seal projection formed on the end face, an annular gasket interposed between the abutting end faces of the joint members, and a nut for joining the joint members, and wherein the seal projection is adapted to press the radial midportion of the gasket.

These pipe joints have the problem that a cavity wherein a liquid is trapped is formed between the inner peripheral portion of the abutting end face of each joint member and the inner peripheral portion of the gasket end face opposed thereto.

Accordingly, the present applicant has filed a patent application for a pipe joint wherein, as shown in FIG. 25, two joint members 41, 42, two seal projections 43, 44 and a gasket 45 have the same inside diameter, and each of the projections 43, 44 is adapted to come into contact with the inner peripheral portion of each face of the gasket 45 over the entire circumference (see SN U.S. Pat. No. 5,482,332).

The pipe joint of the aforementioned application has no liquid trapping cavity and is suitable for use in fabricating semiconductors of which extremely high cleanliness is required, but the pipe joint has the following problem. With reference to FIG. 25 showing the pipe joint as tightened up to the limit of proper range and as depicted with much exaggeration, the inner peripheral portions of opposite end faces of the gasket 45 are recessed by the respective seal projections 43, 44 as the nut is tightened, with the result that even within the limits of proper tightening, the inside peripheral face 45a of the gasket 45 becomes creased as at S, permitting dirt to deposit on the creased portion S.

U.S. Pat. No. 4,854,597 Leigh discloses another pipe joint, whereas this joint has the same problem as that of SN 08/329,963. Thus, pipe joints still remain to be known which have no liquid trapping cavity and are yet free from creases in the inside peripheral face of the gasket when tightened up.

SUMMARY OF THE INVENTION

An object of the present invention is to provide a pipe joint having no liquid trapping cavity and yet free of creasing in the inner peripheral portion of its gasket when tightened up.

Another object of the invention is to provide a pipe joint which enables the worker to readily detect completion of tightening by sensing an altered reaction of tightening.

The present invention provides a pipe joint which comprises a pair of tubular joint members, an annular gasket interposed between abutting end faces of the joint members, and threaded means for joining the joint members, the abutting end faces of the joint members or opposite end faces of the gasket being each formed with a seal projection, so that when the threaded means is completely tightened up, a recess corresponding to the seal projection is created in the face having no seal projection and opposed to the projection, and an inner peripheral portion of the abutting end face of each joint member is brought into intimate contact with an inner peripheral portion of the gasket end face opposed to the abutting end face, the pipe joint being characterized in that the seal projection is positioned radially outward of an inner periphery of the end face formed with the seal projection.

As the threaded means is tightened, the seal projection first comes into contact with the face having no seal projection and opposed to the projection, and an inner peripheral portion of the abutting end face of each joint member then comes into substantially flush relationship with an inner peripheral portion of the gasket end face opposed to the abutting end face, providing a sealing effect and eliminating any liquid trapping cavity on the inner peripheral surface of the connected joint members and gasket. Although the gasket deforms most greatly at the position where the seal projection is formed, this position is not at the inner periphery of the end face where the seal projection is conventionally provided but is outwardly away from the inner periphery, so that the gasket portion deforming most greatly is outward of the inner peripheral portion. Accordingly, the inner peripheral face of the gasket is free of creasing and does not permit deposition of dirt thereon. Thus, the pipe joint is usable for piping of which high cleanliness is required.

When the end of the seal projection is brought into contact with the face having no seal projection by tightening the threaded means, a clearance is formed between the abutting end face of each joint member and an outer peripheral portion of the gasket end face opposed thereto, the clearance being greater than a clearance between the abutting end face of the joint member and the inner peripheral portion of the gasket end face opposed thereto, the greater clearance disappearing when the threaded means is completely tightened up. This desirable construction leads to the following advantage. When the inner peripheral portion of the abutting end face of each joint member is brought into intimate contact with the inner peripheral portion of the gasket end face opposed thereto by tightening the threaded means, a clearance remains between the joint member abutting end face and the outer peripheral portion of the gasket end face. The abutting end face is brought into intimate contact with this outer peripheral portion by further tightening the threaded means. Consequently, the joint member abutting end face contacts the gasket end face under a greater pressure at the inner peripheral portion than at the outer peripheral portion. This is favorable for the sealing effect. Further when the joint member abutting end face comes into intimate contact with the outer peripheral portion of the gasket end face, the tightening torque increases to result in an altered reaction of tightening, which notifies the worker of the completion of tightening. As a result, overtightening is avoidable.

The contour of the seal projection in section comprises a circular-arc portion extending radially outward from the end face formed with the seal projection and a straight portion axially extending from the same end face and joined to the extremity of the circular-arc portion. In this case, the seal projection has an axially extending straight outer peripheral surface, such that immediately before the joint member abutting end face comes into intimate contact with the outer peripheral portion of the gasket end face, the area of contact between the joint member and the gasket remains unincreased even if the threaded member is further tightened. In the meantime, therefore, the reaction of tightening perceived by the worker remains unaltered. The reaction alters upon the joint member abutting end face coming into intimate contact with the outer peripheral portion of the gasket end face, notifying the worker of the completion of tightening. The circular-arc portion can be worked on for hardening, and therefore given enhanced durability.

An overtightening preventing ridge may be formed at an outer peripheral portion of the abutting end face of each joint member to produce resistance against tightening between these ridges when the abutting end face of each joint member is brought into intimate contact with the outer peripheral portion of the gasket end face opposed to the abutting end face. This increases the alteration of the reaction resulting from the intimate contact of the abutting end face with the outer peripheral portion of the gasket end face, permitting the worker to detect the completion of tightening more easily.

The seal projection may be formed on the abutting end face of each of the joint members, and a recess corresponding to the seal projection in each end face of the gasket.

Alternatively, the seal projection may be formed on each end face of the gasket, and a recess corresponding to the seal projection formed in the abutting end face of each joint member. This increases the area of contact between the seal projection end and the face having no seal projection, giving improved durability to the projection.

DESCRIPTION OF THE PREFERRED EMBODIMENTS

Embodiments of the invention will be described below with reference to the drawings. In the following description, the terms "right" and "left" are used based on FIG. 1.

Figure 1:
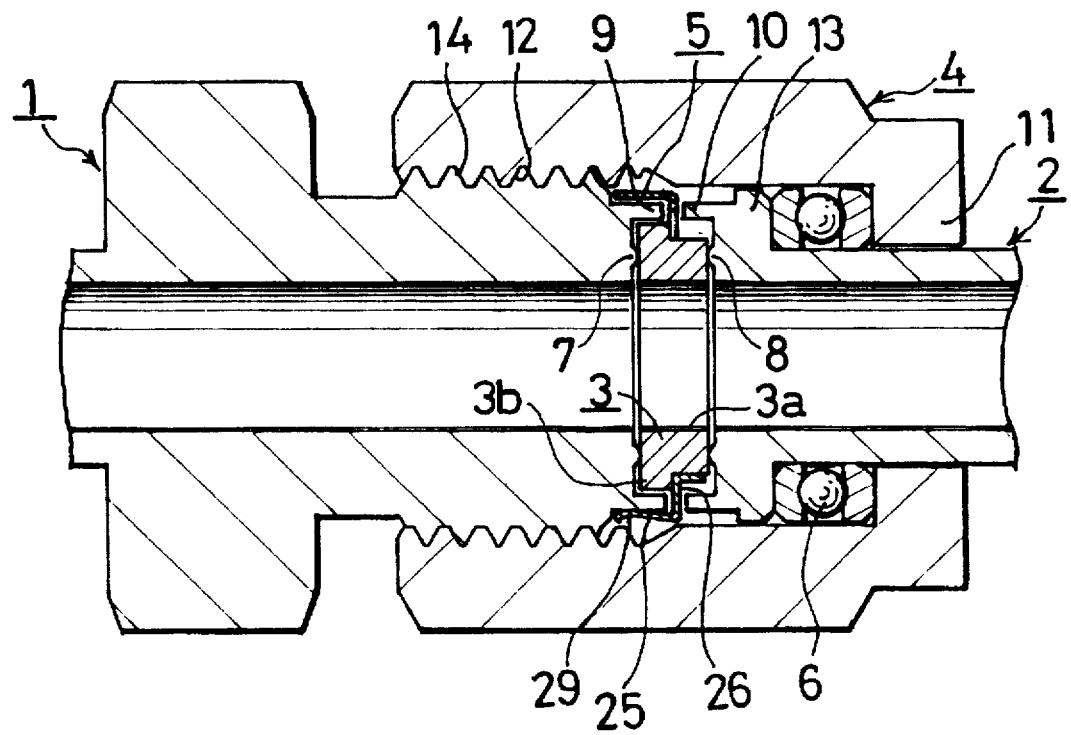
FIG. 1 is a view in longitudinal section showing a first embodiment of pipe joint of the invention.
Figure 2:
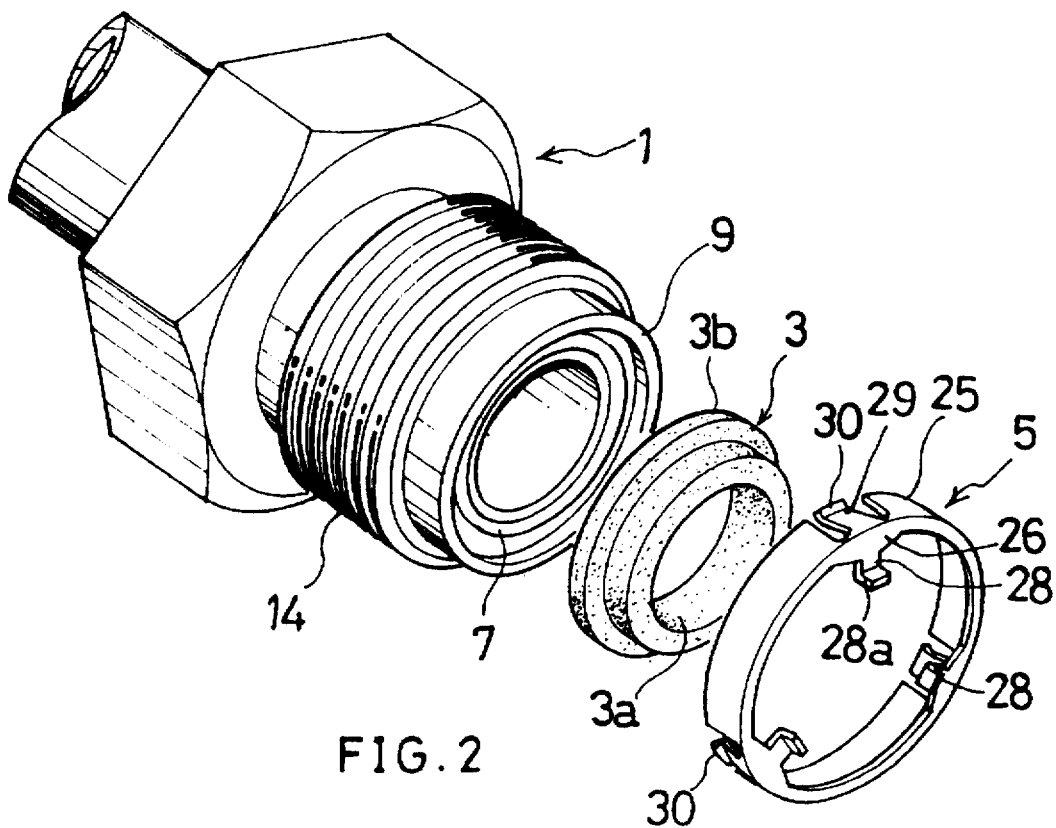
FIG. 2 is an exploded fragmentary perspective view of FIG. 1.

Referring to FIGS. 1 and 2, the pipe joint shown comprises a first tubular joint member 1, a second tubular joint member 2, an annular gasket 3 interposed between the right end face of the first joint member 1 and the left end face of the second joint member 2, and a retainer 5 holding the gasket 3 and held by the first joint member 1. The second joint member 2 is fastened to the first joint member 1 by a nut 4 provided on the member 2 and screwed onto the first member 1. The abutting end faces of the respective joint members 1, 2 are formed, each on its approximate radial midportion, with annular seal projections 7, 8, respectively, and have annular overtightening preventing ridges 9, 10, respectively, at the outer peripheral portion of each member.

The gasket 3 has opposite flat end faces at right angles with the axis of the joint, and is provided on its outer periphery with a slipping-off preventing portion 3b in the form of an outer flange. This portion 3b makes it easy for the worker to cause the retainer 5 to hold the gasket 3 thereto and cause the joint members 1, 2 to hold the retainer 5 thereto.

The joint members 1, 2 and the gasket 3 are made of SUS 316L. The inside diameter of the joint members 1, 2 is equal to that of the gasket 3. Suitable stainless steel other than SUS 316L or other metal is usable for making the joint members 1, 2 and the gasket 3.

The retainer 5, which is integrally made from a stainless steel plate, comprises a ring portion 25, a gasket holding portion 26 having three claws 28 inwardly projecting from the right end of the ring portion 25 and adapted to hold the outer periphery of the gasket 3, and a joint member holding portion 29 engageable with the right end of the first joint member 1. The three claws 28 have slight resiliency. Each of the claws 28 has a rightwardly bent outer end to provide a bent lug 28a having slight resiliency. The gasket 3 is fitted to the inside of the claws 28 with the bent lug 28a in intimate contact with the gasket 3, whereby the gasket 3 in the retainer 5 is prevented from moving radially and axially thereof. At the position where each of the three claws 28 is formed, the ring portion 25 has a pair of axial cutouts to provide a holding pawl 30. The three pawls 30 thus formed provide the joint member holding portion 29. The three holding pawls 30 resiliently grip the right end outer surface of the first joint member 1, whereby the retainer 5 is held to the first joint member 1. The claws 28 and the holding pawls 30 are not limited to three in number; four claws or pawls may be provided.

The nut 4 has an inner flange 11 formed at its right end and fitting around the second joint member 2. The nut 4 has at its left end an internally threaded portion 12, which is screwed on an externally threaded right portion 14 of the first joint member 1. The second joint member 2 has an outer flange 13 on the outer periphery of its left end. A thrust ball bearing 6 is interposed between the outer flange 13 and the inner flange 11 of the nut 4 for preventing the joint member 2 from rotating with the nut 4.

Figure 3:
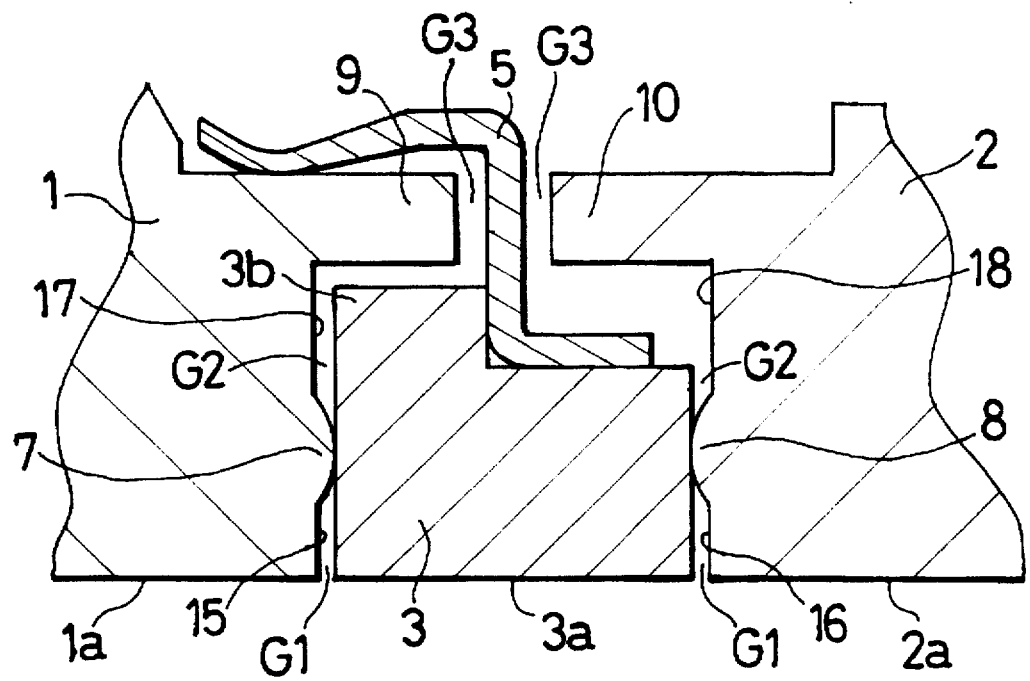
FIG. 3 is an enlarged fragmentary view in section of FIG. 1 showing the joint when a nut is tightened by hand.
Figure 4:
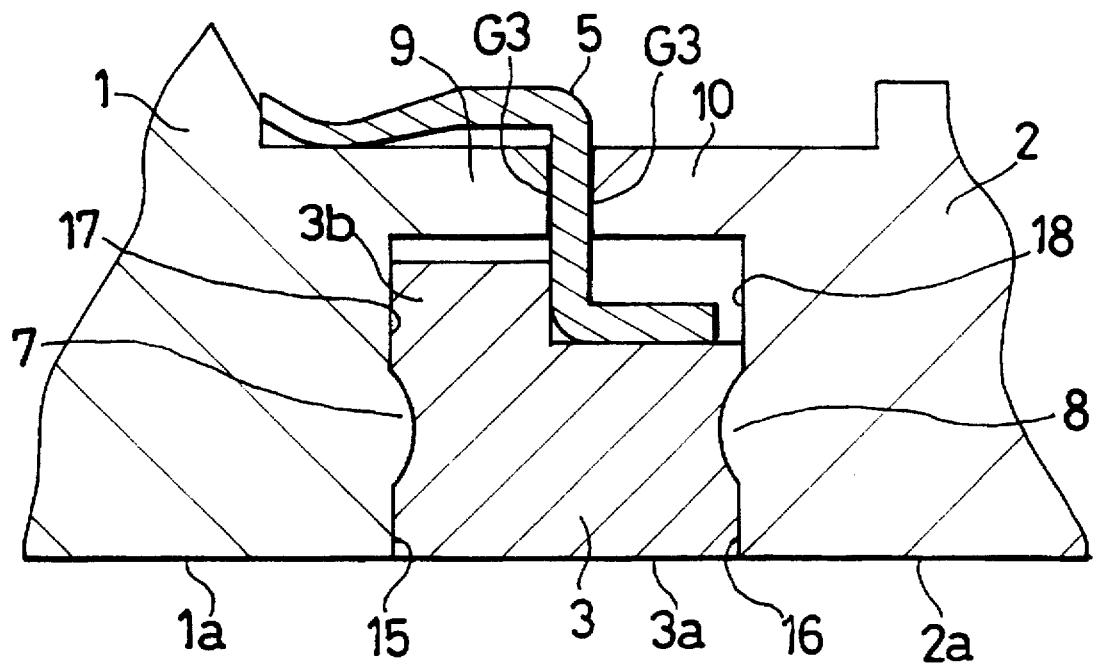
FIG. 4 is a view showing the joint when the nut is further tightened from the state of FIG. 3 and tightened up completely.

FIGS. 3 and 4 show the feature of the first embodiment of pipe joint of the invention in greater detail. Each of the seal projections 7, 8 has a circular-arc section, and the abutting end face formed with the projection 7 (8) includes an inner flat face 15 (16) and an outer flat face 17 (18) at the respective inner and outer sides of the seal projection 7 (8). The inner flat face 15 (16) is positioned axially closer to the gasket 3 than the outer flat face 17 (18).

The overtightening preventing ridges 9, 10 project rightward and leftward beyond the projections 7, 8, respectively, and are adapted to press the retainer 5 on opposite sides thereof when the nut 4 is to be tightened up more than is properly. These ridges 9, 10 protect the projections 7, 8 of the joint members 1, 2 before assembling, whereby the projections 7, 8 are precluded from damage that would seriously influence the sealing properties.

FIG. 3 shows the pipe joint as tightened by hand with the nut 4. As the nut 4 is tightened, the extremity of each of the seal projections 7, 8 first comes into contact with the end face of the gasket 3 opposed thereto. At this time, an inner clearance G1 is present between the inner flat face 15 (16) of each joint member 1 (2) and the left (right) end face of the gasket 3, and an outer clearance G2 greater than the clearance G1 remains between the outer flat face 17 (18) of each joint member 1 (2) and the left (right) end face of the gasket 3. There is a still greater clearance G3 between the overtightening preventing annular ridge 9 (10) and the retainer 5. Thus, G1 < G2 < G3. As the nut 4 is further tightened from the manually tightened state as by a wrench, the gasket 3 deforms, reducing the inner clearance G1 to zero. At this time, the outer clearance G2 is not zero. When the joint is tightened up properly, the outer clerance G2 also diminishes to zero as shown in FIG. 4, the inner flat face 15 (16) comes into intimate contact with the inner peripheral portion of the left (right) end face of the gasket 3, and the inner periphery 1a (2a) of each joint member 1 (2) becomes substantially flush with the inner periphery 3a of the gasket 3. Consequently, no liquid trapping cavity remains. Even at this time, the clearance G3 between each annular ridge 9 (10) and the retainer 5 has not reduced to zero. When the nut 4 is further tightened, the clearance G3 between the ridge 9 (10) and the retainer 5 diminishes to zero, creating greatly increased resistance against tightening, whereby overtightening is prevented.

With the first embodiment described, the gasket 3 and the seal projections 7, 8 are so dimensioned as to eliminate the clearances G1, G2 between the gasket 3 and the joint members 1, 2 when the tightening torque reaches the proper value. For example, the seal projections 7, 8 have a height of 0.1 mm above the respective inner flat faces 15, 16, and the circular arc is 0.5 mm in radius. The outer flat faces 17, 18 are recessed from the respective inner flat faces 15, 16 by 0.02 mm. When the nut 4 has been rotated by hand, the distance between the retainer 5 and the overtightening preventing ridges 9, 10 is 0.17 mm. The inner flat faces 15, 16 contact the gasket 3 when the nut 4, as manually rotated, is further rotated through 56.7 deg, and the outer flat faces 17, 18 contact the gasket when the nut 4 is rotated through 68 deg from the manually rotated position as a reference position. The distance between the joint members 1, 2, as positioned by manual tightening decreases by 0.317 mm when the nut has been tightened through exactly 90 deg, eventually causing the inner flat faces 15, 16 and the outer flat faces 17 18 to bite into the gasket 3 by 0.06 mm and 0.04 mm, respectively. When the nut is further rotated through 5.7 deg for tightening, the ridges 9, 10 come into contact with the retainer 5, whereby overtightening is precluded.

The circular-arc surfaces of the seal projections 7, 8 may partly include a straight portion, or each circular-arc surface may be straight instead of having a circular-arc cross sectional configuration in the vicinity of its extremity. FIGS. 5 and 6 and FIGS. 10 to 13 show embodiments which are modified variously in the shape of the projection. When joint members 1, 2 are described below which differ in the projection only, different projections only will be designated by different reference numerals, and like parts already described other than the joint members 1, 2 will be designated by like reference numerals and will not be described repeatedly.

Figure 5:
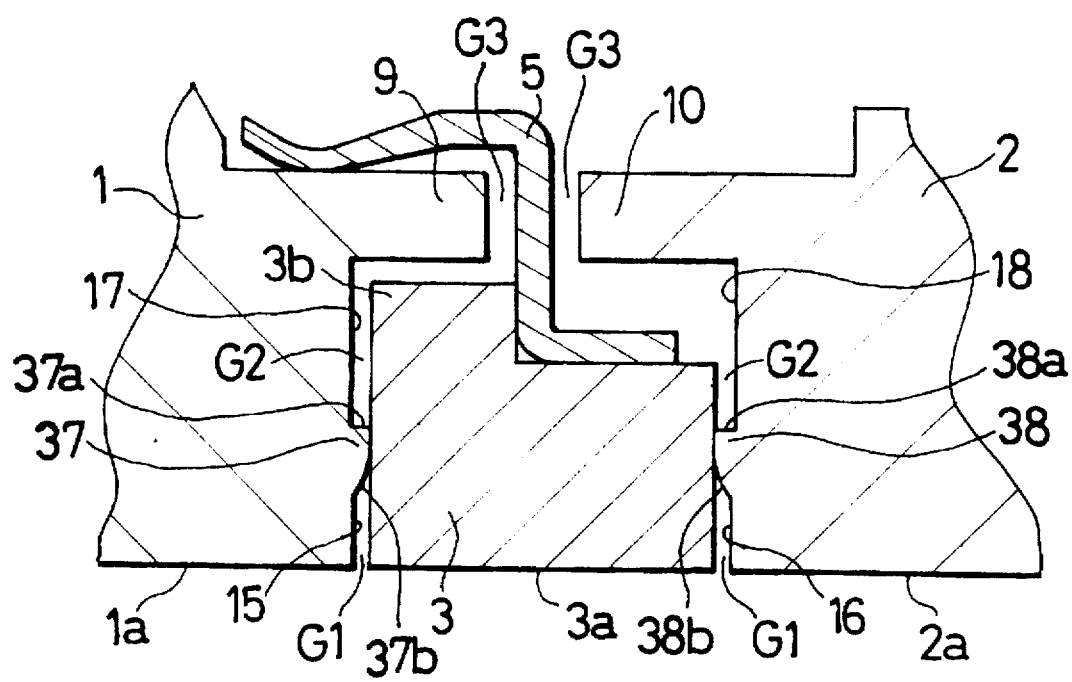
FIG. 5 is an enlarged fragmentary view in section showing a second embodiment of pipe joint when the nut thereof is tightened by hand.
Figure 6:
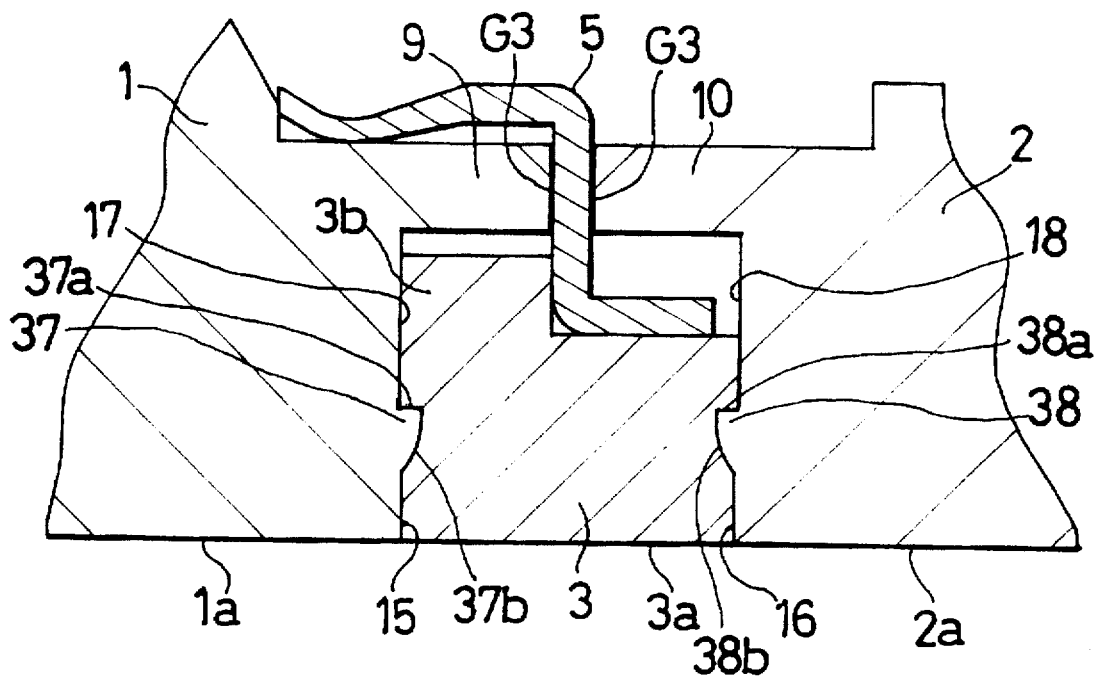
FIG. 6 is a view showing the joint when the nut is further tightened from the state of FIG. 5 and tightened up completely.

FIGS. 5 and 6 show a second embodiment, in which a seal projection 37 (38) of each joint member 1 (2) corresponds to the seal projection 7 (8) of the first embodiment shown in FIGS. 3 and 4 from which an outer peripheral portion is partly cut away, so that the seal projection 37 (38) has an outer periphery extending axially. The contour of the seal projection 37 (38) in section comprises a circular-arc portion 37b (38b) extending radially outward from the abutting end face of each joint member 1 (2), and a straight portion 37a (38a) axially extending from the same end face and joined to the extremity of the circular-arc portion 37b (38b). The circular-arc portion 37b (38b) is centered about a point radially inward of the straight portion 37a (38a).

Each seal projection 37 (38) has a height of 0.1 mm above the inner flat face 15 (16) of each joint member 1 (2), and is 0.5 mm in the radius of the circular arc. The outer flat faces 17, 18 are recessed from the respective inner flat faces 15, 16 by 0.02 mm. The overtightening preventing annular ridges 9, 10 are at a distance of 0.17 mm from the retainer 5 when the nut is manually tightened. The inner flat faces 15, 16 contact the gasket 3 when the nut in a manually tightened position, i.e., in a reference position, is rotated through 56.7 deg, and the outer flat faces 17, 18 contact the gasket 3 when the nut is tightened through 68 deg from the reference position. The distance between the joint members 1, 2 as positioned by manual tightening decreases by 0.317 mm when the nut has been finally tightened through exactly 90 deg, causing the inner flat faces 15, 16 and the outer flat faces 17, 18 to bite into the gasket 3 by 0.06 mm and 0.04 mm, respectively. When the nut is further tightened through 5.7 deg, the ridges 9, 10 come into contact with the retainer 5, whereby overtightening is prevented.

Figure 7:
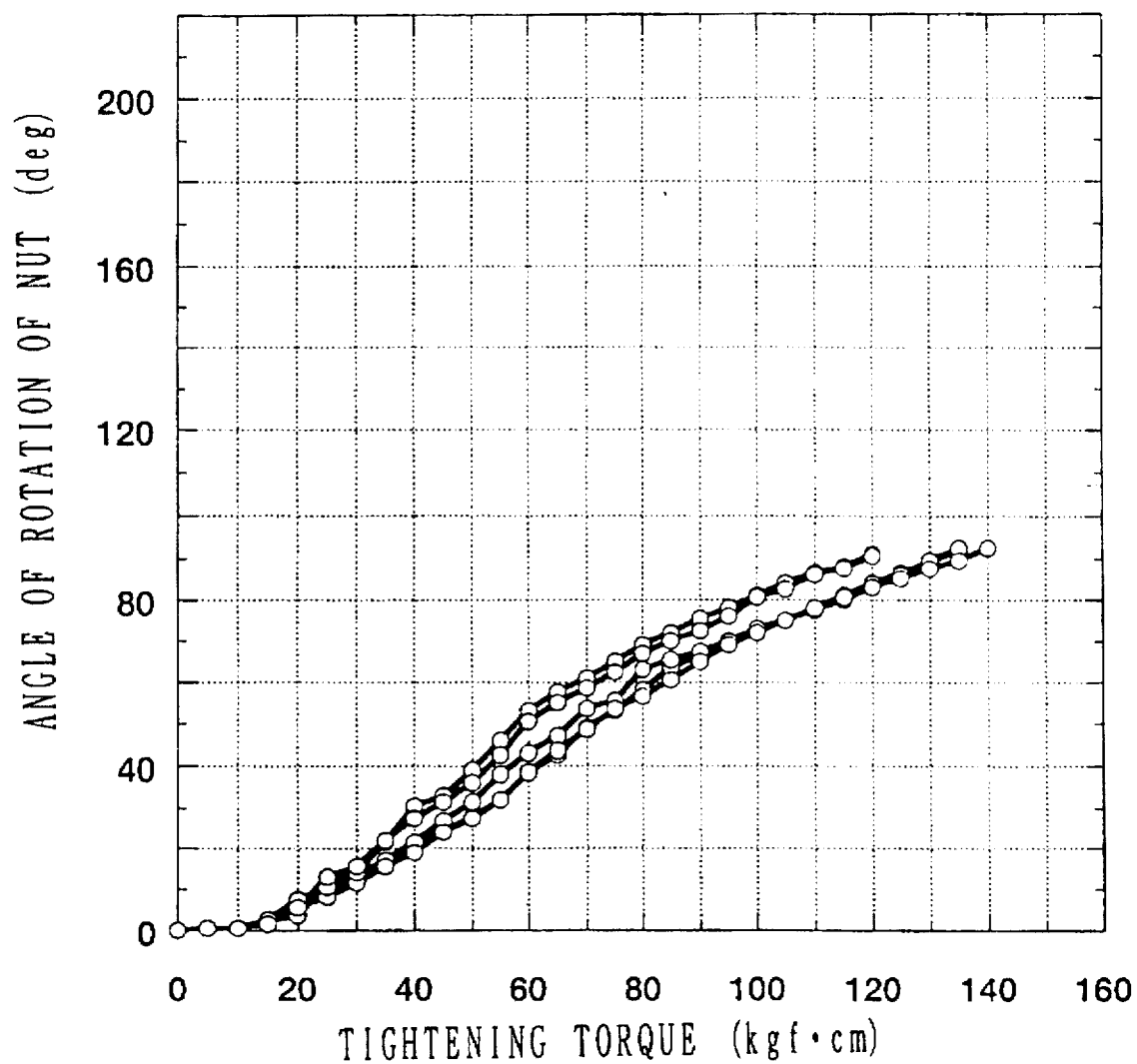
FIG. 7 is a graph showing the relationship between the angle of rotation of the nut and the tightening torque when the pipe joint of the first, embodiment is tightened.
Figure 8:
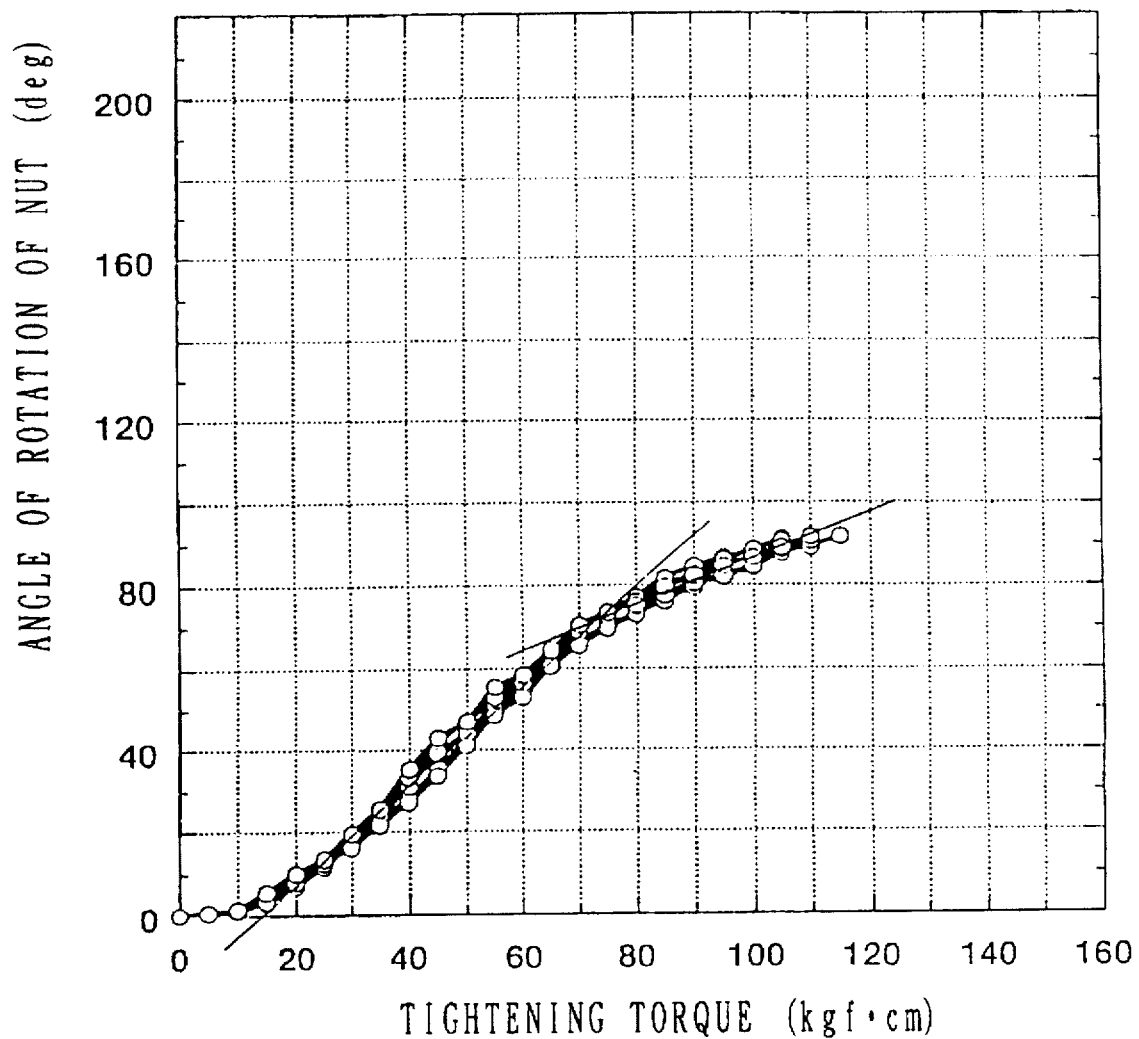
FIG. 8 is a graph showing the relationship between the angle of rotation of the nut and the tightening torque when the pipe joint of the second embodiment is tightened.

FIGS. 7 and 8 show the relationship between the angle of rotation of the nut 4 plotted as ordinate and the tightening torque as abscissa which relationship was established for the first and second embodiments described. FIG. 7, which shows the result obtained for the first embodiment, indicates that the tightening torque increases approximately linearly as the nut 4 is tightened. FIG. 8, representing the second embodiment, shows that the slope alters at an angle of rotation of the nut 4 of about 70 deg. Stated more specifically, the seal projections 37, 38 of the second embodiment have a smaller radial length than those of the first embodiment, so that until the outer flat faces 17, 18 contact the gasket 3, the increase of the tightening torque relative to the angle of rotation of the nut 4 is smaller, and the graph is consequently steep. After the contact of the outer flat faces 17, 18 with the gasket 3, however, the area of contact of each joint member 1 (2) with the gasket 3 is greater than in the first embodiment, with the result that the increase in the tightening torque relative to the angle of rotation of the nut 4 is great, and the slope of the graph approaches the horizontal, hence an apparent alteration in the slope at a rotational angle of the nut 4 of about 70 deg.

Figure 9:
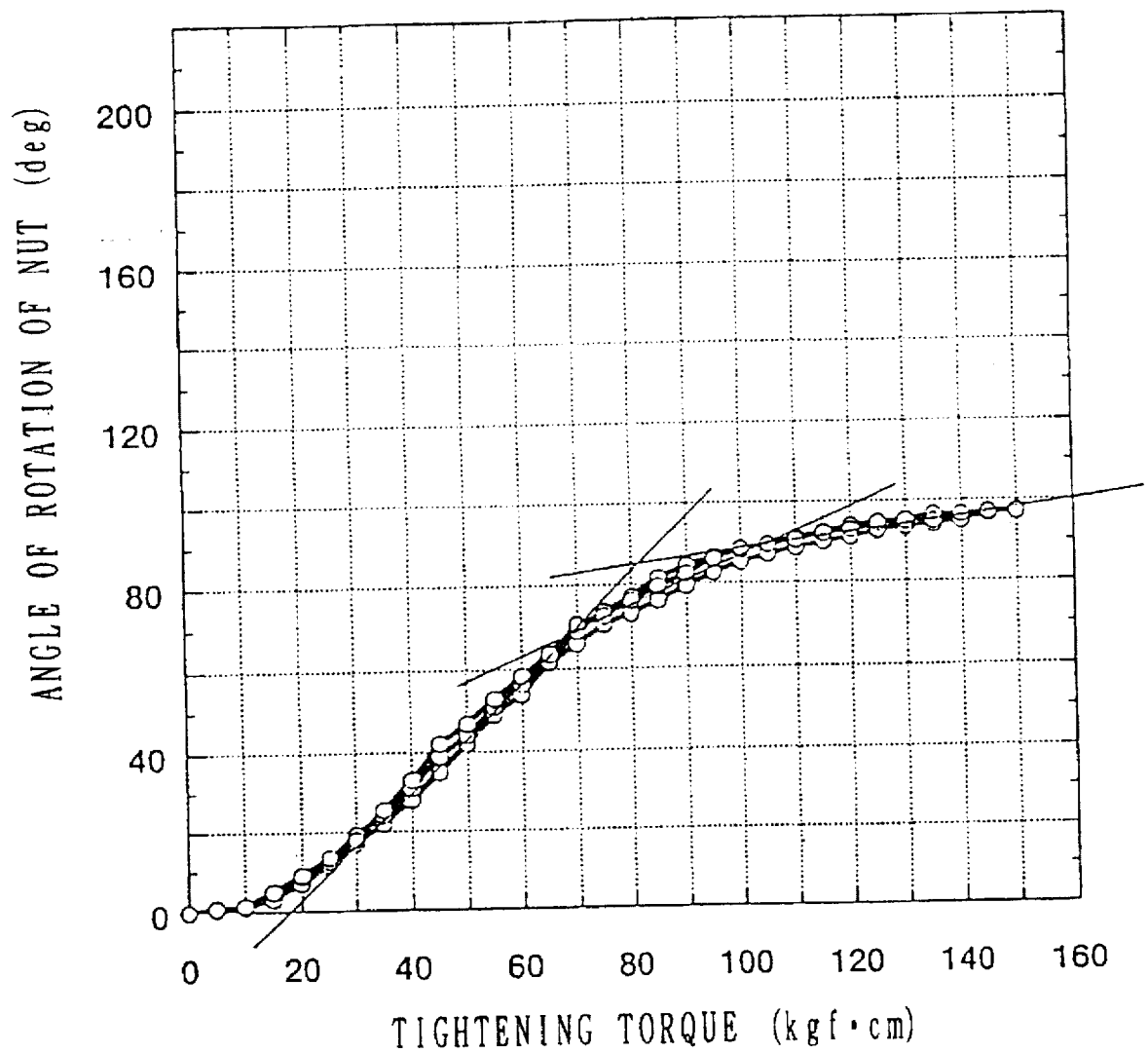
FIG. 9 is a graph showing the relationship between the angle of rotation of the nut and the tightening torque when a third embodiment of pipe joint is tightened.

FIG. 9 shows the relationship between the angle of rotation of the nut 4 plotted as ordinate and the tightening torque as abscissa, as established for a third embodiment. With the second embodiment, the overtightening preventing annular ridges 9, 10 are at a distance of 0.17 mm from the retainer 5 when the nut is manually tightened, whereas this distance is 0.15 mm in the pipe joint of the third embodiment which is not shown. When the outer flat faces 17, 18 come into contact with the gasket 3, the distance between the retainer 5 and the ridges 9, 10 is 0.03 mm according to calculation. When the nut as manually tightened is rotated through about 85 deg, the ridges 9, 10 come into contact with the retainer 5, with the result that the graph is closer to the horizontal. Consequently, the reaction of the tightening torque for rotating the nut 4 through about 85 deg is very great, enabling the tightening worker to detect the completion of tightening.

Figure 10:
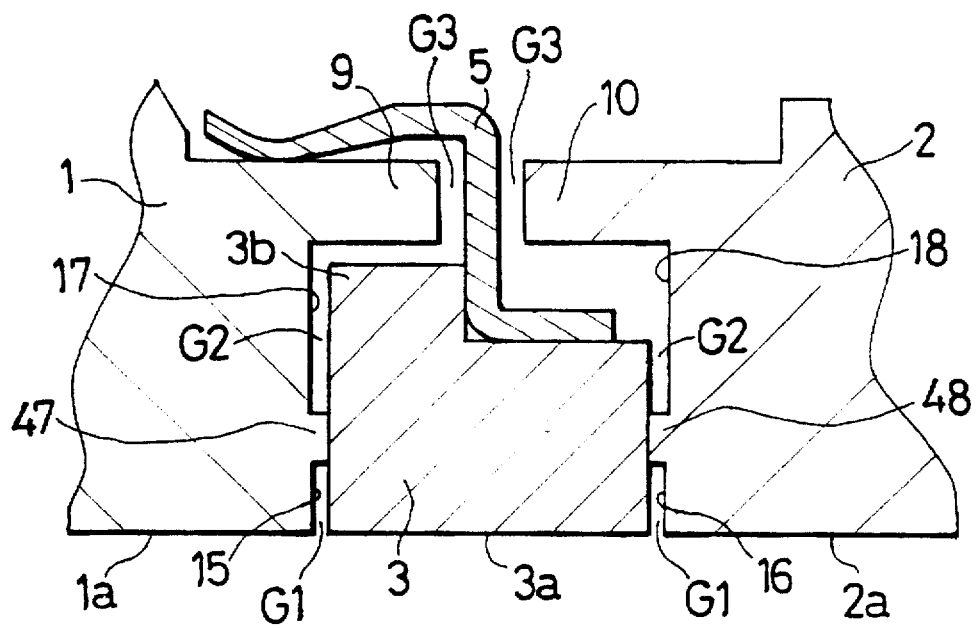
FIG. 10 is an enlarged fragmentary view in section showing a third embodiment of pipe joint of the invention when the nut thereof is tightened by hand.

FIG. 10 shows a third embodiment, wherein seal projections 47, 48 are rectangular in sectional shape. The pipe joint with such seal projections 47, 48 has substantially the same relationship between the angle of rotation of the nut 4 and the tightening torque as is shown in FIG. 8 or 9, while the area of contact at the extremity of each seal projection 47 (48) is not different from that at the base end thereof, so that the torque varies at a constant rate until the base end of the projection 47 (48) comes into contact with the end face of the gasket 3. This makes the subsequent variation of the slope distinct.

Figure 11:
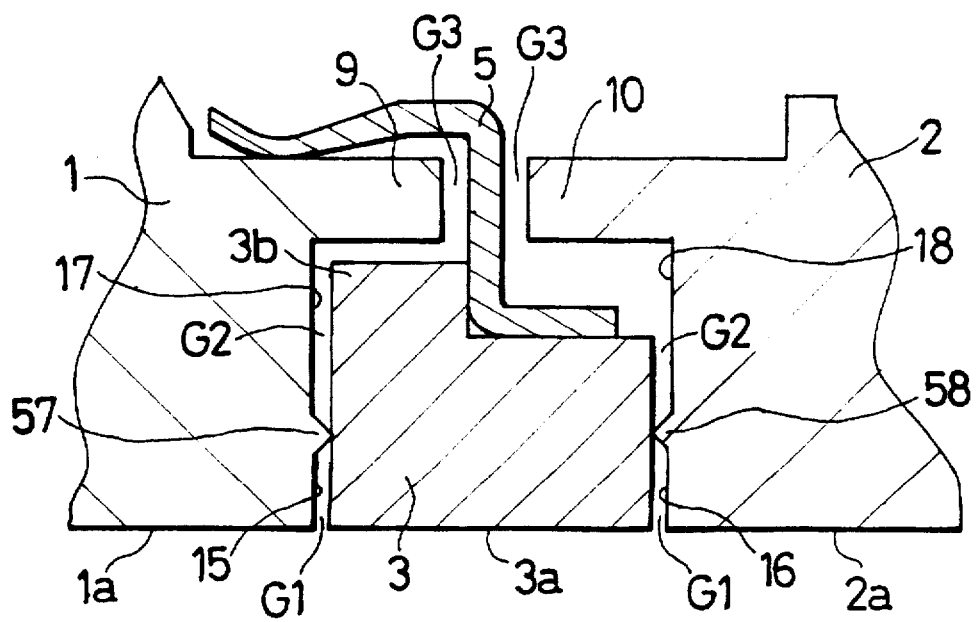
FIG. 11 is an enlarged fragmentary view in section showing a third embodiment of pipe joint of the invention when the nut thereof is tightened by hand.
Figure 12:
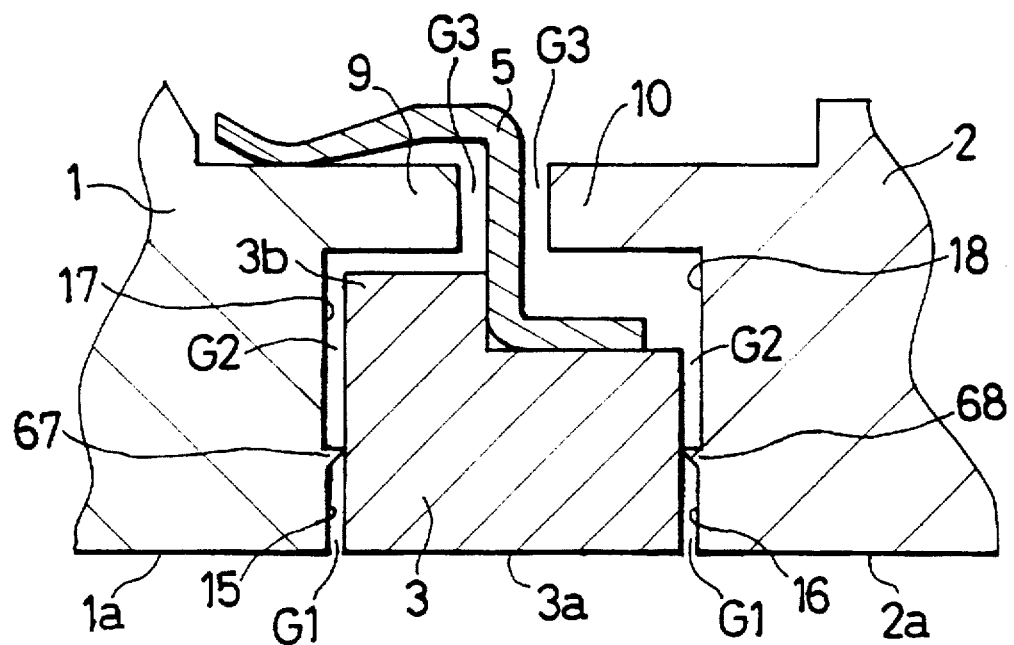
FIG. 12 is an enlarged fragmentary view in section showing a fifth embodiment of pipe joint of the invention when the nut thereof is tightened by hand.
Figure 13:
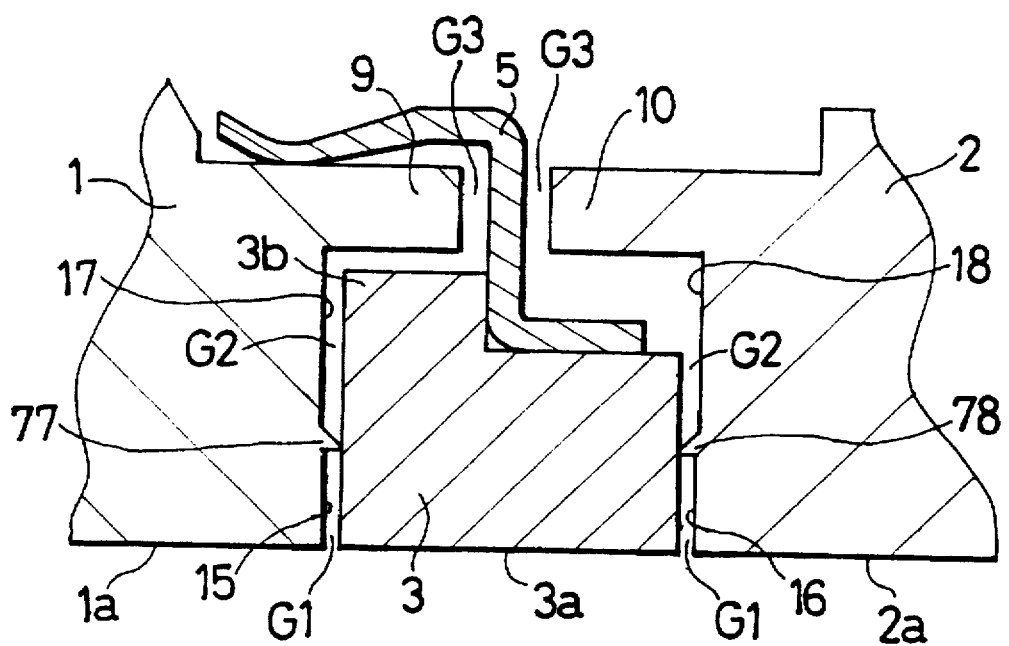
FIG. 13 is an enlarged fragmentary view in section showing a sixth embodiment of pipe joint of the invention when the nut thereof is tightened by hand.

FIG. 11 shows a fourth embodiment, wherein seal projections 57, 58 have an isosceles triangular shape in section. FIG. 12 shows a fifth embodiment, wherein seal projections 67, 68 are in the form of a right-angled triangle in section and have an axially extending outer periphery. FIG. 13 shows a sixth embodiment, wherein seal projections 77, 78 are in the form of a right-angled triangle in section and have an axially extending inner periphery. Between the angle of rotation of the nut 4 and the tightening torque, the fourth embodiment to the sixth embodiment, i.e., the pipe joints with the seal projections 57, 58, 67, 77, 77, 78, have a relationship resembling that of FIG. 8 or 9 but characterized in that while each of the seal projections 57, 58, 67, 68, 77, 78 is in contact with the gasket end face opposed thereto, the tightening torque increases at a lower rate than in the case of the second embodiment since each seal projection has a sharp extremity. This enables the worker to readily perceive the alteration of reaction in the second half of the tightening procedure and to easily detect the completion of tightening. The pipe joints of the fourth to seventh embodiments having the seal projections 57, 58, 67, 68, 77, 78 are slightly inferior to the first and second embodiments with the circular-arc projections 7, 8, 37, 38 in being susceptible to damage; seal projections of suitable shape are to be selected in conformity with the performance required of the pipe joint. The seal projections 37, 38 included in the second embodiment not only have the advantage that the completion of tightening involves an apparent variation of the slope but also can be hardened and thereby given sufficient durability.

With the first to seventh embodiments, the gasket has flat opposite end faces, and a seal projection is formed on each joint member, whereas the seal projection may alternatively be provided on each end face of the gasket, with the abutting end face of the joint member made planar. FIGS. 14 to 17 show such embodiments.

Figure 14:
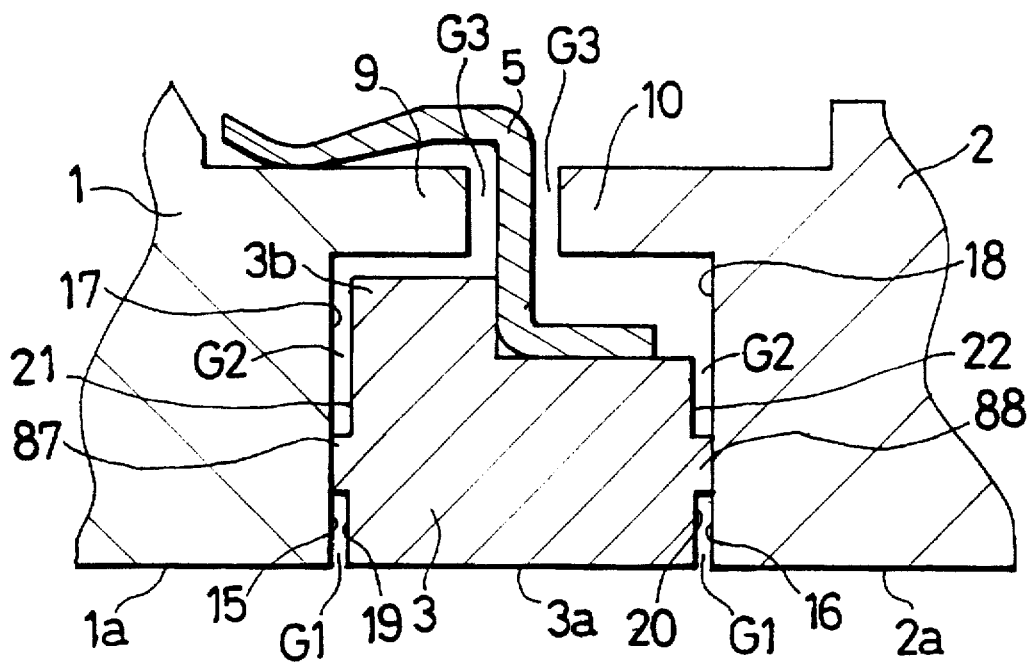
FIG. 14 is an enlarged fragmentary view in section showing an seventh embodiment of pipe joint of the invention when the nut thereof is tightened by hand.
Figure 15:
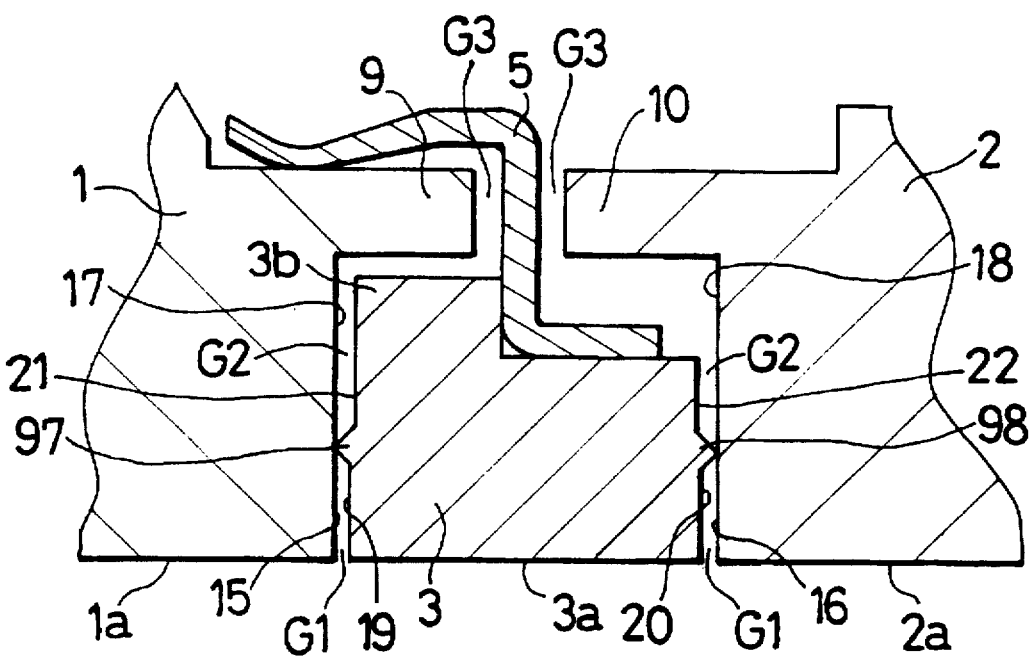
FIG. 15 is an enlarged fragmentary view in section showing a eighth embodiment of pipe joint of the invention when the nut thereof is tightened by hand.
Figure 16:
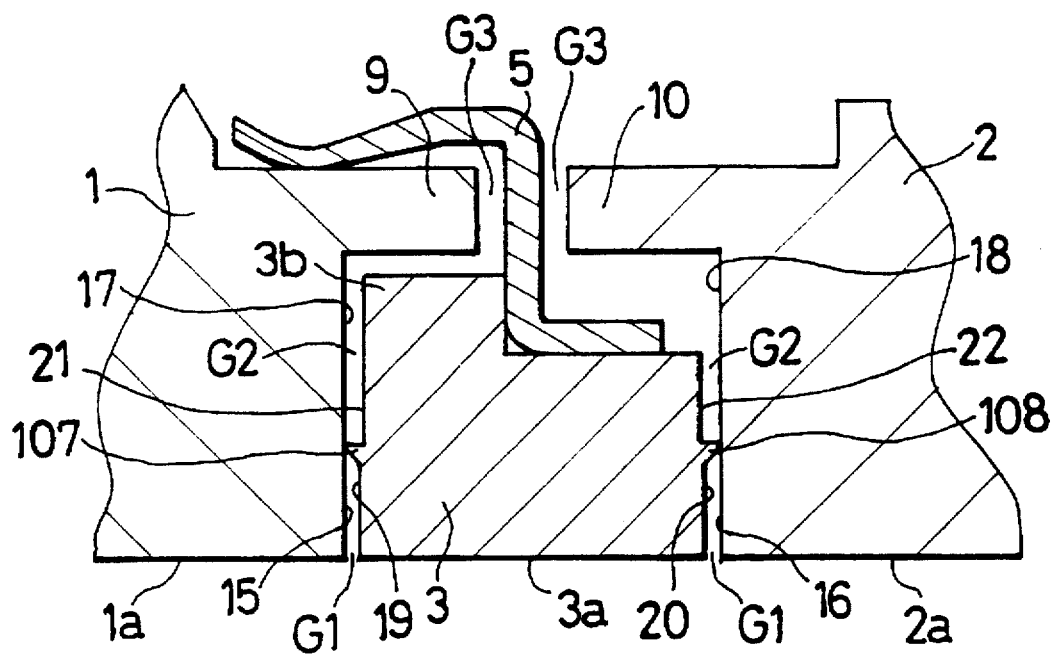
FIG. 16 is an enlarged fragmentary view in section showing a ninth embodiment of pipe joint of the invention when the nut thereof is tightened by hand.
Figure 17:
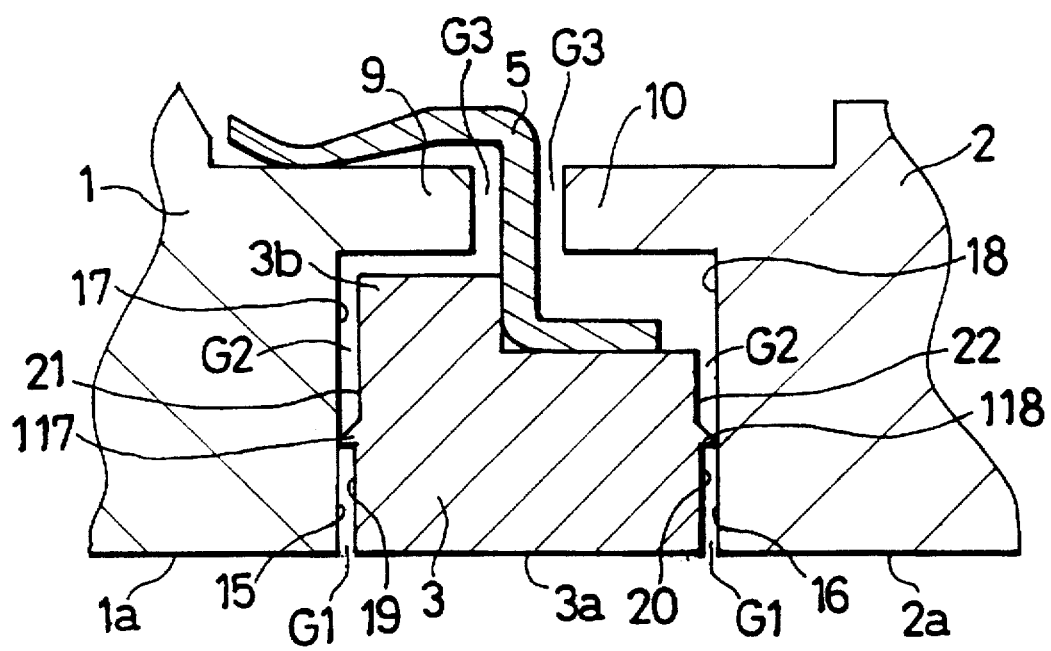
FIG. 17 is an enlarged fragmentary view in section showing an tenth embodiment of pipe joint of the invention when the nut thereof is tightened by hand.

FIG. 14 shows an seventh embodiment, in which seal projections 87, 88 are rectangular in section. Since the area of contact of each seal projection 87 (88) at its extremity remains unaltered at its base end, the torque varies at a constant rate until the base end of the projection 87 (88) comes into contact with the end face of each joint member 1 (2), hence the feature that the subsequent variation of the slope becomes distinct. FIG. 15 shows a eighth embodiment, wherein seal projections 97, 98 are in the form of an isosceles triangle in section. FIG. 16 shows a ninth embodiment, in which seal projections 107, 108 are in the form of a right-angled triangle in section and have an axially extending outer periphery. FIG. 17 shows an tenth embodiment, in which seal projections 117, 118 are in the form of a right-angled triangle in section and have an axially extending inner periphery. These embodiments have the feature that while each of the seal projections 97, 98, 107, 108, 117, 118 is in contact with the end face of the joint member 1 (2) opposed thereto, the tightening torque increases at a lower rate than in the case of the second embodiment because each seal projection has a sharp extremity. This leads to the feature that the worker readily perceives the alteration of the reaction in the second half of the tightening procedure to easily detect the completion of tightening.

With reference to the seventh to tenth embodiments, the abutting fakes of the joint members 1, 2 each include an inner flat face 15 (16) and an outer flat face 17, (18) which is flush with the face 15 (16). The gasket 3 has inner flat faces 19, 20 positioned closer to the respective joint members 1, 2 than respective outer flat faces 21, 22 of the gasket axially of the joint. With the nut 4 tightened up by hand, therefore, there exists an inner clearance G1 between the inner flat face 15 (16) of each joint member 1 (2) and the inner flat face 19 (20) of the gasket 3, and an outer clearance G2 greater than the clearance G1 is present between the outer flat face 17 (18) of each joint member 1 (2) and the outer flat face 21 (22) of the gasket 3. There is a still greater clearance G3 between each overtightening preventing ridge 9 (10) and the retainer 5. Thus, G1 < G2 < G3. These clearances G1, G2, G3 all diminish to zero when the nut is completely tightened up.

FIGS. 18 to 21 show embodiments which comprise joint members each having a seal projection, and a gasket formed in each end face thereof with a recess corresponding to the seal projection.

Figure 18:
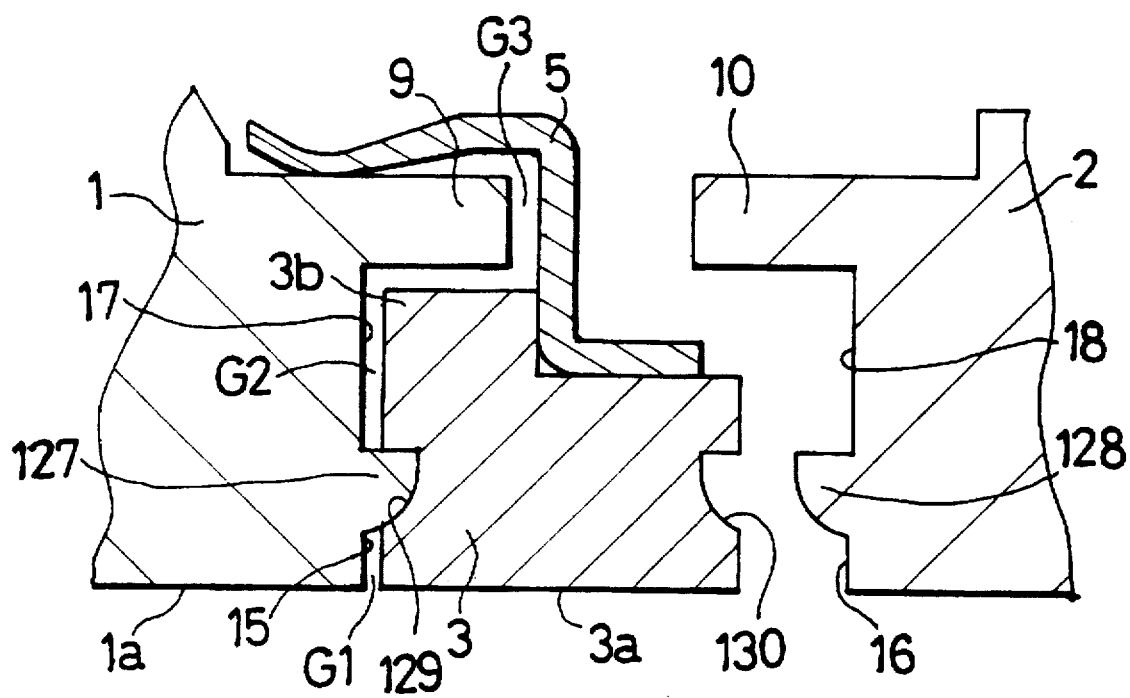
FIG. 18 is an enlarged fragmentary view in section showing a eleventh embodiment of pipe joint of the invention when the nut thereof is tightened by hand and when a joint member is away from a gasket.
Figure 19:
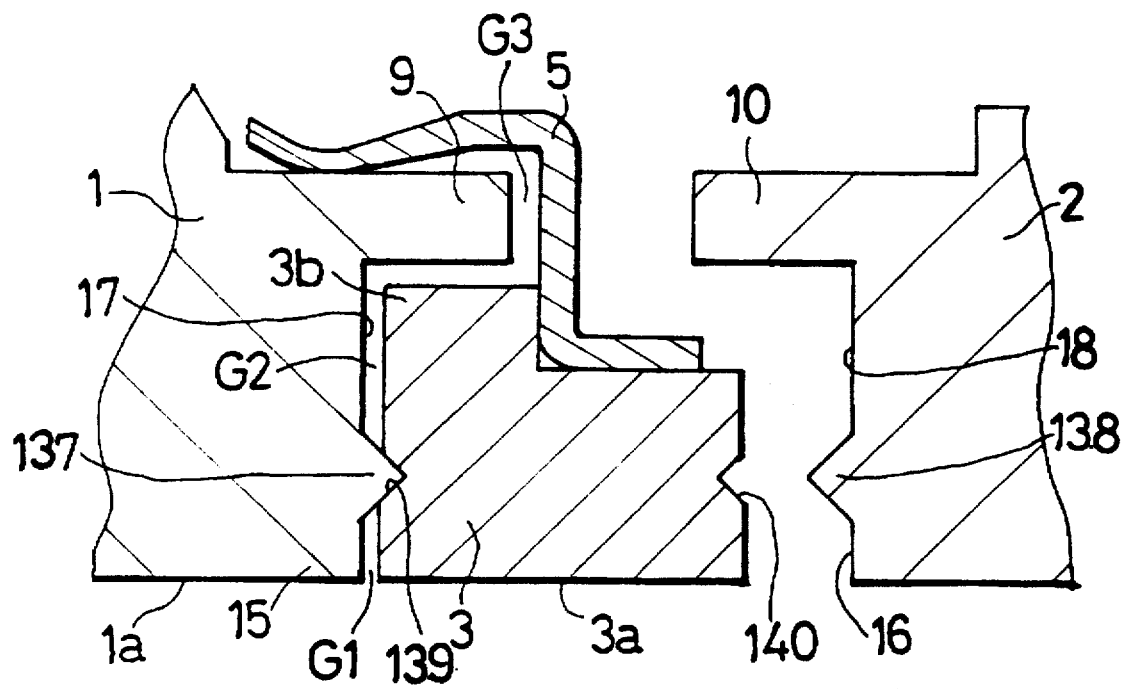
FIG. 19 is an enlarged fragmentary view in section showing a twelfth embodiment of pipe joint of the invention when the nut thereof is tightened by hand and when a joint member is away from a gasket.
Figure 20:
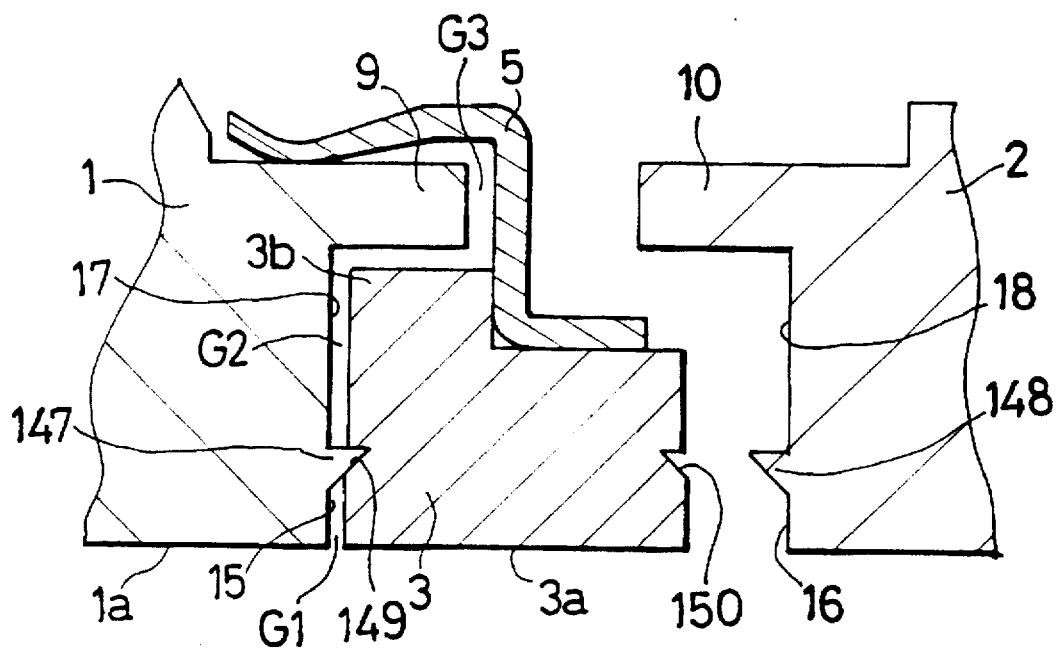
FIG. 20 is an enlarged fragmentary view in section showing a thirteenth embodiment of pipe joint of the invention when the nut thereof is tightened by hand and when a joint member is away from a gasket.
Figure 21:
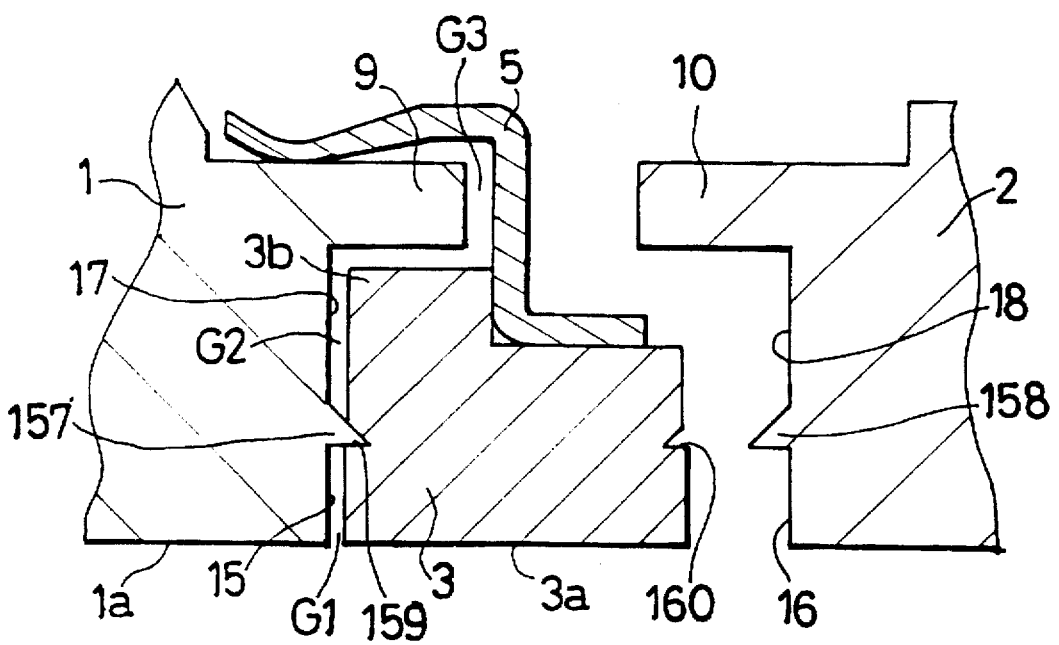
FIG. 21 is an enlarged fragmentary view in section showing a fourteenth embodiment of pipe joint of the invention when the nut thereof is tightened by hand and when a joint member is away from a gasket.

FIG. 18 shows a eleventh embodiment, wherein seal projections 127, 128 on the respective joint members 1, 2 are similar to those of the second embodiment in sectional shape, and the gasket 3 is formed with recesses 129, 130 having substantially the same shape as, and slightly smaller than, the seal projections 127, 128. FIG. 19 shows a twelfth embodiment, wherein seal projections 137, 138 on the respective joint members 1, 2 are in the form of an isosceles triangle in section, and the gasket 3 is formed with recesses 139, 140 having substantially the same shape as, and slightly smaller than, the seal projections 137, 138. FIG. 20 shows a thirteenth embodiment, wherein seal projections 147, 148 are in the form of a right-angled triangle in section and having an axially extending outer periphery, and the gasket 3 is formed with recesses 149, 150 having substantially the same shape as, and slightly smaller than, the seal projections 147, 148. FIG. 21 shows a fourteenth embodiment, wherein seal projections 157, 158 are in the form of a right-angled triangle in section and having an axially extending inner periphery, and the gasket 3 is formed with recesses 159, 160 having substantially the same shape as, and slightly smaller than, the seal projections 157, 158.

With the eleventh to fifteenth embodiments described, each recess of the gasket is formed in a flat end face, and the inner flat face 15 (16) of each joint member is positioned axially closer to the gasket 3 than the outer flat face 17 (18) of the joint member. With the nut 4 tightened up by hand, therefore, there exists an inner clearance G1 between the inner flat face 15 (16) of each joint member 1 (2) and the left (right) end face of the gasket 3, and an outer clearance G2 greater than the clearance G1 is present between the outer flat face 17 (18) of each joint member 1 (2) and the left (right) end face of the gasket 3. There is a still greater clearance G3 between each overtightening preventing ridge 9 (10) and the retainer 5. Thus, G1 < G2 < G3. All of these clearances G1, G2, G3 diminish to zero when the nut is completely tightened up.

The eleventh to fifteenth embodiments described have, in addition to the same advantage as the first and second embodiments, another advantage in that the area of contact of each seal projection 127 (128, 137, 138, 147, 148, 157, 158) with the corresponding recessed portion 129 (130, 139, 140, 149, 150, 159, 160) of the gasket 3 is greater than that of each seal projection 7 (8, 37, 38) with the flat end face of the gasket 3 opposed thereto, making the seal projection 127 (128, 137, 138, 147, 148, 157, 158) less susceptible to damage. The former embodiments also have the advantage that the gasket 3 can be positioned in place by the seal projections 127, 128 (137, 138, 147, 148, 157, 158) fitting into the corresponding recesses 129, 130 (139, 140, 149, 150, 159, 160). If the accuracy of positioning required of the gasket 3 is low, the retainer 5 can be omitted from these twelfth to fifteenth embodiments.

Although not illustrated, it is useful to provide a seal projection on each end face of the gasket and to form in the abutting end face of each joint member a recess corresponding to the seal projction, based on the same concept as is the case with the first and second embodiments.

Figure 22:
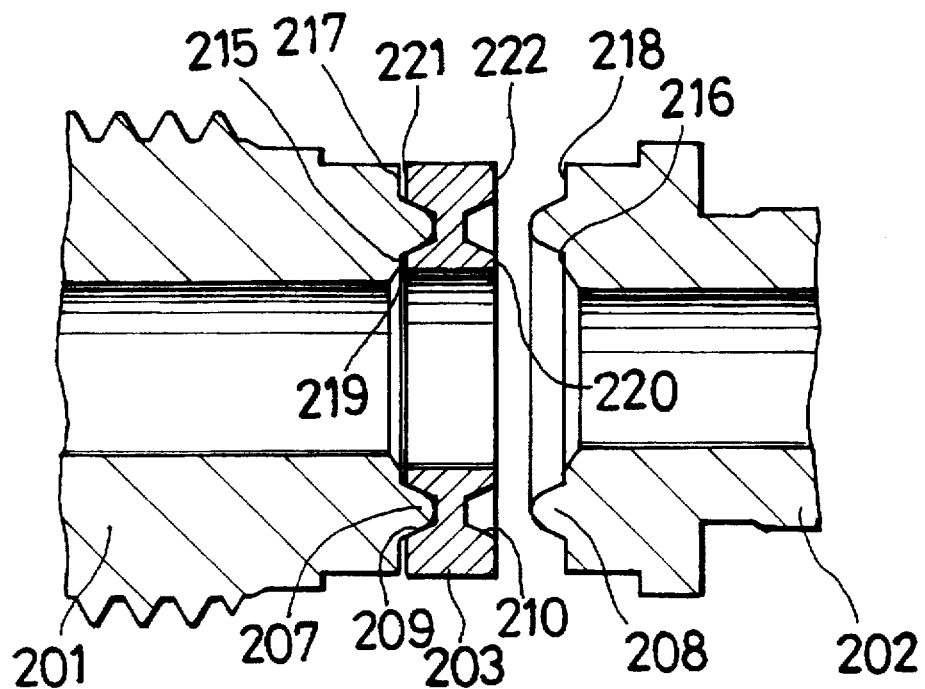
FIG. 22 is a view in longitudinal section showing a fifteenth embodiment of pipe joint of the invention.
Figure 23:
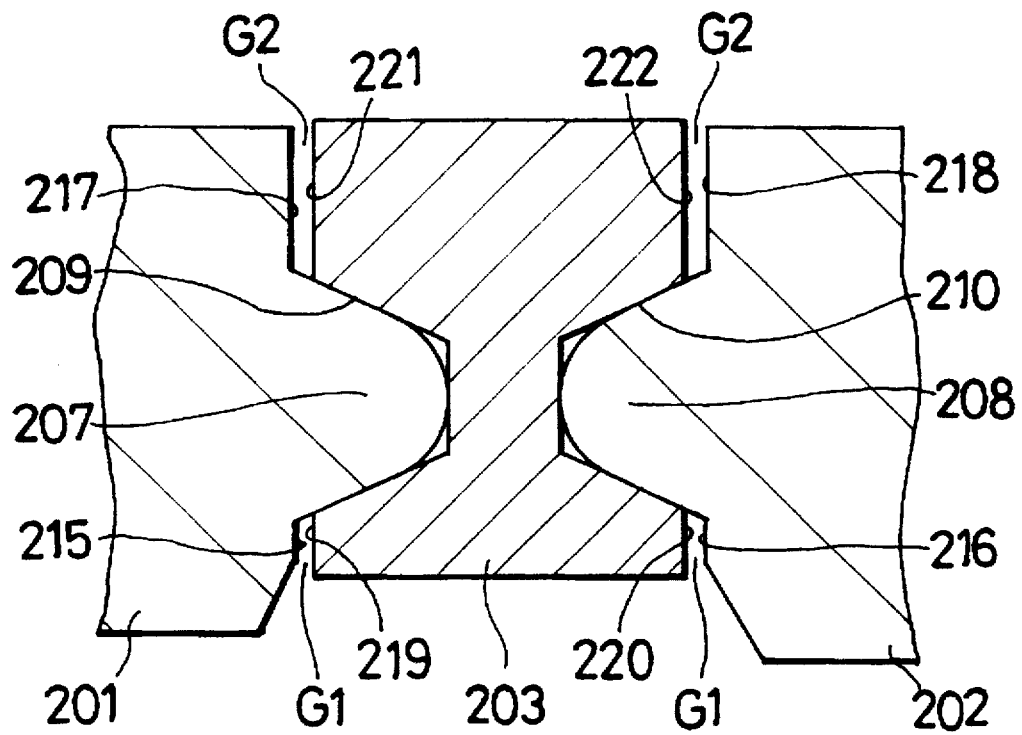
FIG. 23 is an enlarged fragmentary view in section of FIG. 22 showing the joint when the nut thereof is tightened by hand.

FIG. 22 shows a fifteenth embodiment, which comprises joint members 201, 202 of one of the conventional types. Each of the joint members 201, 202 is formed approximately in the center of its abutting end face with an annular seal projection 202 (208) approximately trapezoidal in section and having a circular-arc extremity. An inner flat face 215 (216) and an outer flat face 217 (218) formed respectively on the inner and outer sides of the seal projection 207 (208) are positioned within a plane. The seal projections 207, 208 are greater than those 7, 8 of the joint members 1, 2 included in the first embodiment, and when used in combination with a gasket 3 with flat opposite end faces like the one shown in FIG. 3, the joint members 201, 202 of the conventional type have the problem that a clearance is formed between an inner peripheral portion of the gasket 3 and the inner peripheral portion of each of the joint members 201, 202. FIG. 22 shows a gasket 203 which is shaped in conformity with the conventional joint members 201, 202 having the great seal projections 207, 208 and which is formed with recesses 209, 210 corresponding to the projections 207, 208 and each having a trapezoidal cross section. Each end face of the gasket 203 includes an inner flat face 219 (220) and an outer flat face 221 (222) on the inner and outer sides of the recess 209 (210), respectively. The inner portion of the gasket 203 has a larger thickness than the outer portion thereof, and the inner flat faces 219, 220 are positioned as projected beyond the respective outer flat faces 221, 222. Accordingly, in the state shown in FIG. 23 and brought about by tightening the nut 4 by hand, there exists an inner clearance G1 between the inner flat face 215 (216) of each joint member 201 (202) and the inner flat face 219 (220) of the gasket 203. A clearance G2 greater than the clearance G1 is present between the outer flat face 217 (218) of the joint member 210 (212) and the outer flat face 221 (222) of the gasket 203. When the nut 4 is further tightened by a wrench or like tool, the seal projection 207 (208) and the gasket 203 deform, eliminating the inner clearance G1. At this time, the outer clearance G2 is not zero. The outer clearance G2 also diminishes to zero on completion of tightening. As in the foregoing embodiments, the slope of the tightening torque approaches the horizontal upon the outer flat faces 217, 218 of the joint members 1, 2 coming into contact with the respective outer flat faces 221, 222 of the gasket 203. This readily indicates whether the nut has been tightened up properly. Accordingly, pipe joints incorporating the joint members 201, 202 of the conventional type can be improved in sealing properties and so adapted as to enable the worker to readily detect complete tightening of the joint, by replacing the gasket of the joint by the gasket 203 described above.

Figure 24:
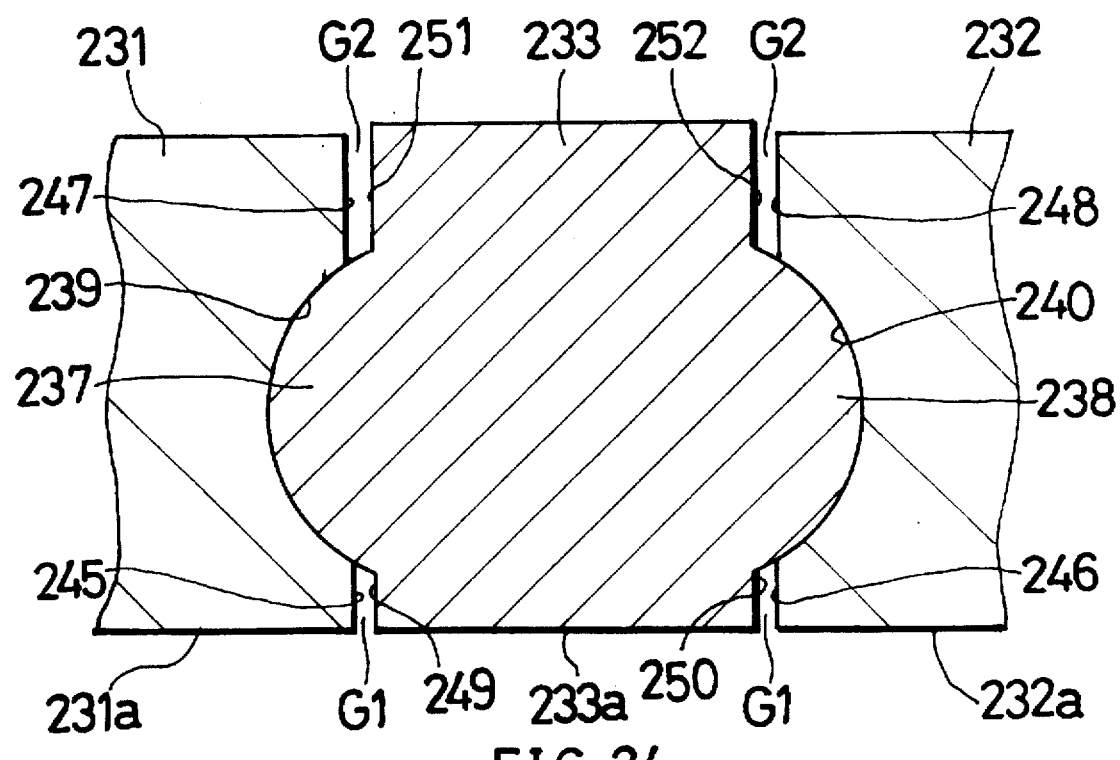
FIG. 24 is an enlarged fragmentary view in section showing a sixteenth embodiment of pipe joint of the invention when the nut thereof is tightened by hand.
Figure 25:
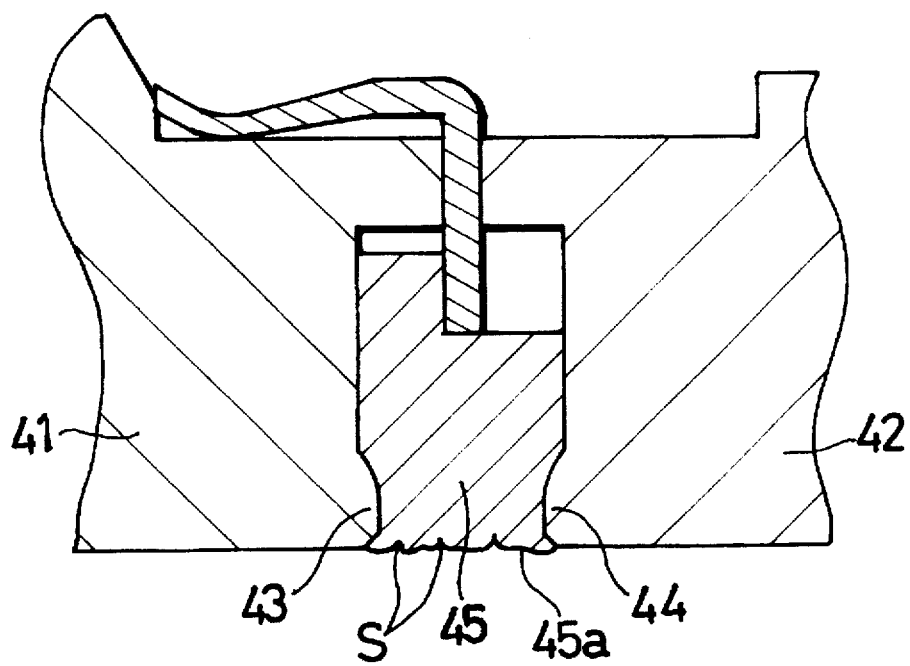
FIG. 25 is a view showing a conventional pipe joint as tightened up completely.

FIG. 24 shows a sixteenth embodiment, which comprises joint members 231, 232 of another one of the conventional types. A gasket fitting annular recess 239 (240) is formed approximately in the center of the abutting end face of each joint member 231 (232). Such joint members 231, 232 are used usually in combination with a gasket having a circular section, and have the problem that a clearance occurs between an inner peripheral portion of the gasket and the inner peripheral portion of each of the joint members 231, 232 on completion of tightening because the gasket in section is considerably great relative to the joint member. FIG. 24 shows a gasket 233 which is shaped in conformity with such joint members 231, 232. The gasket 233 is formed on the respective end faces thereof with seal projections 237, 238 having a circular-arc section and corresponding to the respective annular recesses 239, 240 of the joint members 231, 232. Each end face of the gasket 233 includes an inner flat face 249 (250) and an outer flat face 251 (252) on the inner and outer sides of the seal projection 237 (238), respectively. The inner portion of the gasket 233 has a larger thickness than the outer portion thereof, and the inner flat faces 249, 250 are positioned as projected beyond the respective outer flat faces 251, 252. Accordingly, in the state shown in FIG. 24 and brought about by tightening the nut 4 by hand, there exists an inner clearance G1 between the inner flat face 245 (246) of each joint member 231 (232) and the inner flat face 249 (250) of the gasket 233. A clearance G2 greater than the clearance G1 is present between the outer flat face 247 (248) of the joint member 231 (232) and the outer flat face 251 (252) of the gasket 233. When the nut 4 is further tightened as by a wrench, the gasket 233 deforms, eliminating the inner clearance G1. At this time, the outer clearance G2 is not zero. On completion of tightening, the outer clearance G2 also diminishes to zero, the inner flat faces 245, 246 of the joint members 231, 232 come into intimate contact with the respective inner flat faces 249, 250 of the gasket 233, and the inner peripheries 231a, 232a of the joint members 231, 232 become substantially flush with the inner periphery 233a of the gasket 233. Thus any liquid trapping cavity no longer remains. As in the foregoing embodiments, the slope of the tightening torque approaches the horizontal upon the outer flat faces 249, 250 of the joint members 231, 232 coming into contact with the respective outer flat faces 251, 252 of the gasket 233. This readily indicates whether the nut has been tightened up properly. Accordingly, pipe joints incorporating the conventional joint members 231, 232 can be improved in sealing properties and so adapted as to enable the worker to readily detect complete tightening of the joint, by replacing the gasket of the joint by the gasket 233 described above.

What is claimed is:

1. A pipe joint comprising a pair of tubular joint members, an annular gasket interposed between abutting end faces of the joint members, and threaded means for joining the joint members, the abutting end faces of either of the joint members and opposite end faces of the gasket being formed with a seal projection and the other being formed without a seal projection, so that, when the threaded means is completely tightened up, a recess corresponding to the seal projection is in the face of one of the other of said joint members and opposite end faces of said gasket and the other having no seal projection and opposed to the projection, and an inner peripheral portion of each joint member is brought into substantially flush relationship with an inner peripheral portion of the gasket and the entire seal projection is positioned radially outward of an inner periphery of the end face formed with the seal projection.

2. A pipe joint as defined in claim 1, wherein, when an end of the seal projection is brought into contact with the face having no seal projection by tightening the threaded means, clearances are formed between the abutting end face of each of the joint members and the gasket end face opposed thereto, the clearance between the outer peripheral portions of the joint member and of the gasket being greater than the clearance between the inner peripheral portions of the joint members and of the gasket opposed thereto, the greater of said clearances being eliminated when the threaded means is completely tightened up.

3. A pipe joint as defined in claim 2 wherein the seal projection has a sectional contour which comprises a circular-arc portion extending radially outward from the end face formed with the seal projection, and a straight portion axially extending from the same end face and joined to an extremity of the circular-arc portion.

4. A pipe joint as defined in claim 2 wherein an overtightening preventing ridge is formed at an outer peripheral portion of the abutting end face of each joint member to produce resistance against tightening between the overtightening preventing ridges when the abutting end face of each joint member is brought into intimate contact with the outer peripheral portion of the gasket end face opposed to the abutting end face.

5. A pipe joint as defined in claim 2, wherein the seal projection is formed on the abutting end face of each of the joint members, and a recess corresponding to the seal projection is pre-formed in each end face of the gasket.

6. A pipe joint as defined in claim 2, wherein the seal projection is formed on each end face of the gasket, and a recess corresponding to the seal projection is pre-formed in the abutting end face of each of the joint members.

* * * * *